_United States Patent Office_  
2,932,655  
Patented Apr. 12, 1960

2,932,655

16(SUBSTITUTED METHYL)PREGNENOLONES AND DERIVATIVES

Robert H. Mazur, Evanston, and John A. Cella, Skokie, Ill., assignors to G. D. Searle & Co., Chicago, Ill., a corporation of Delaware No Drawing. Application August 9, 1956
Serial No. 603,183

7 Claims. (Cl. 260—397.3)

This invention relates to pregnenolone derivatives wherein there is present a 16-methyl radical substituted by an acid residue, said derivatives being optionally esterified in position 3, or oxidized thereat to corresponding ketones. More particularly, this invention relates to compounds of the formula

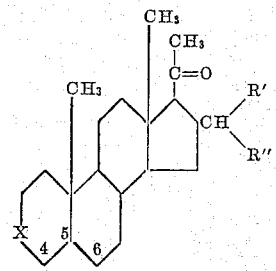

wherein R' and R" are variously cyano, acetyl, or ethoxycarbonyl radicals; X is a hydroxymethylene, (lower alkanoyl)oxymethylene, or carbonyl radical; and the carbon atom in position number 5 is doubly bonded to solely one of the carbons at 4 and 6.

By "lower alkanoyl" in the foregoing formula is meant

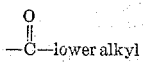

the lower alkyl radicals contemplated being methyl, ethyl, propyl, isopropyl, butyl, isobutyl, sec-butyl, tert-butyl, pentyl, sec-n-pentyl, primary isopentyl, sec-isopentyl, tert-pentyl, hexyl, and similar $C_nH_{2n+1}$ radicals such that $n$ is a positive integer amounting to less than 7.

It will be apparent to those skilled in the art that the compounds of this invention constitute a relatively homogeneous chemical grouping in that they are, unexceptionably, 3-oxygenated pregnen-20-ones distinguished by the incorporation at carbon atom 16 of a particular kind of organic radical, namely, an acid radical derived from the limited class of substances made up of $CH_2(CN)_2$, malononitrile
$CH_2(COCH_3)_2$, acetylacetone
$CH_2(COOC_2H_5)$, diethyl malonate
$CH_2(CN)COCH_3$, acetylacetonitrile
$CH_2(CN)COOC_2H_5$, ethyl cyanoacetate and $CH_2(COCH_3)COOC_2H_5$, ethyl acetoacetate The latter substances are all characterized by the presence of two electronegative groups attached to methylene, and share a familial capacity for giving up protons under the influence of alkali or alkali metals. Moreover, such substances have in common the fact that they are typical of compounds susceptible to Michael condensation, viz., base-catalyzed addition to the $\alpha,\beta$ double bond of a conjugated unsaturated ketone. Thus, whether viewed wholly or in part, the compounds to which this application relates will be seen to partake of that community of chemical properties essential to their generic treatment herein.

The claimed compounds are valuable because of their desirable pharmacological activity. For example, the subject compounds are anti-inflammatory agents, being adapted to protection against the hyperemia associated with specific types of iritis. Additionally, the compounds of this invention have anti-infective properties: they inhibit in particular species, cortisone-induced enhancement of the adverse effects of Coxsackie virus. Still further, the compounds here disclosed are useful anabolic-androgenic agents: they promote nitrogen retention, contribute to muscle growth, and tend to stimulate the development of secondary sex characteristics in males.

The compounds of this invention are relatively insoluble in water, but may be dissolved in such common organic solvents as alcohol, chloroform, ethyl acetate, and the like. The subject compounds may be administered in solid form as tablets or capsules; dissolved in aqueous media, they may be given parenterally.

The 3-acetoxy compounds to which this invention relates are conveniently prepared by interaction at substantially room temperatures of 16-dehydropregnenolone acetate with an alkali metal and an appropriate member of the group, malononitrile, acetylacetone, diethyl malonate, acetylacetonitrile, ethyl cyanoacetate, and ethyl acetoacetate, there being provided a liquid alcoholic medium (1) where the reagents would otherwise comprise a solid mixture or (2) where it is preferred to insure in situ formation of alkoxide for catalytic purposes. The corresponding 3-hydroxylated materials of the invention are obtained from the acetoxy compounds by mild alkaline hydrolysis, and may in turn be treated according to usual techniques with an acid anhydride or chloride of choice to give a particular ester hereof. Alternatively, the 3-hydroxy compounds may be subjected to Oppenauer oxidation to the respective 3-ketonic products claimed.

The following examples describe in detail certain of the compounds illustrative of this invention, and methods which have been devised for their preparation. However, the invention is not to be construed as limited thereby, either in spirit or in scope, since it will be apparent to those skilled in the art of organic synthesis that many modifications, both of materials and of methods, may be practiced without departing from the purpose and intent of this disclosure. In the examples hereinafter detailed, temperatures are given in degrees centigrade (° C.) and relative amounts of materials in parts by weight, except as otherwise noted.

*Example 1*

*3β-acetoxy-16-dicyanomethylpregn-5-en-20-one.*—To a solution of 13 parts of potassium in 335 parts of tert-butyl alcohol at room temperatures is added 22 parts of malononitrile. There is then introduced 60 parts of 3β-acetoxypregna-5,16-diene-20-one, same being washed into the reaction vessel with approximately 335 parts of tert-butyl alcohol. The resultant mixture is agitated and refluxed at the boiling point of the solvent in a nitrogen atmosphere overnight. Neutralization is effected with 20 parts of acetic acid, following which solvent is evaporated in vacuo. The residue is extracted into chloroform, and the chloroform extract is then washed with water and finally dried over anhydrous sodium sulfate. Chloroform is distilled off; and residue is chromatographed on silica gel, using benzene and ethyl acetate as developing solvents. There is obtained by this means 3β-acetoxy-16-dicyanomethylpregn-5-en-20-one, which, recrystallized from anhydrous alcohol, melts in the range 160–190° C. The product is a mixture of the α and β dicyanomethyl isomers. It has the formula

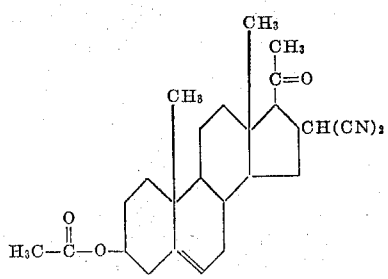

*Example 2*

*16 - dicyanomethyl - 3β - hydroxypregn - 5 - en - 20-one.*—To 1000 parts of anhydrous ethyl alcohol are added 100 parts of 3β-acetoxypregna-5,16-dien-20-one, 14 parts of sodium, and 40 parts of malononitrile. The resultant mixture is agitated at room temperatures until a clear solution results, whereupon said solution is allowed to stand undisturbed at room temperatures for 24 hours. The solution is then diluted with a large volume of water, whereby hydrolysis of the 3-acetoxyl group is accomplished. Extraction into chloroform, followed by evaporation of solvent and chromatography of the residue on silica gel—using benzene and ethyl acetate as developing solvents—affords 16-dicyanomethyl-3β-hydroxypregn-5-en-20-one, which crystallizes from ethyl alcohol as hard, iridescent prisms melting at 206–209° C. The product has the formula.

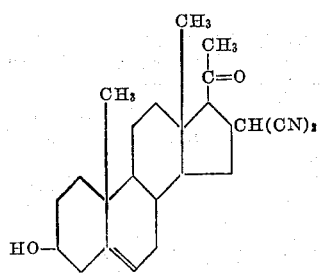

*Example 3*

*16 - dicyanomethylpregn - 4 -ene - 3,20 - dione.*—A mixture of 17 parts of 16-dicyanomethyl-3β-hydroxypregn-5-en-20-one, 170 parts of freshly distilled cyclohexanone, and 100 parts of 20% (w./v.) aluminum isoproproxide in dry toluene is added to 1500 parts of dry toluene; and the resultant mixture is refluxed at the boiling point of the solvent for two hours. After cooling, the mixture is added to 1500 parts of 50% aqueous potassium sodium tartrate, whereupon steam distillation is effected to remove volatile organics. The crude product remaining in the distilland is extracted into chloroform, the extract is stripped of solvent by evaporation, and the residue is chromatographed on silica gel. Elution with a mixture consisting of 10% ethyl acetate in benzene gives 16-dicyanomethylpregn-4-ene-3,20-dione, which, recrystallized from a mixture of benzene and cyclohexane, melts at 206–210° C. A 1:1 mixture of the product with starting material melts at 186–198° C. The product has the formula

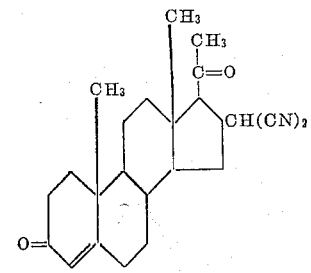

*Example 4*

*3β - acetoxy - 16 - diacetylmethylpregn - 5 - en - 20-one.*—Solution of 3 parts of sodium in 2 parts of acetylacetone is effected by heating with agitation under a nitrogen atmosphere at 100° C. To the chilled solution is added 36 parts of powdered 3β-acetoxypregna-5,16-dien-20-one, same being washed into the reaction vessel with an additional 100–200 parts of acetylacetone. The resultant mixture is agitated at 90–100° C. under a nitrogen atmosphere for 16–24 hours, during which time suspended solids dissolve. The reaction mixture is then cooled and acidified with 12 parts of acetic acid. The bulk of excess acetylacetone is removed by distillation in vacuo, and the residue is quenched in about 200 parts of water. The organic phase is extracted into ether, and the ether extract is washed with water and then dried over anhydrous sodium sulfate. Solvent is evaporated; and the residue is chromatographed on silica gel, using benzene and ethyl acetate as developing solvents. The 3β-acetoxy-16-diacetylmethylpregn-5-en-20-one thus obtained is further purified by recrystallization from anhydrous alcohol. The product melts at 182–186° C. and has the formula

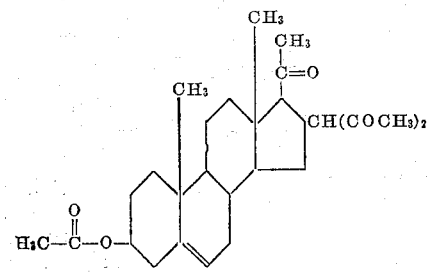

*Example 5*

*16-diacetylmethyl-3β-hydroxypregn-5-en-20-one.*—To a solution of 1 part of sodium in 345 parts of methyl alcohol is added 1 part of water followed by 20 parts of 3β-acetoxy-16-diacetylmethylpregn-5-en-20-one. The resultant mixture is heated under reflux at the boiling point of the solvent until neutral to phenolphthalein. The mixture is then evaporated to dryness in vacuo, whereupon the residue is extracted into chloroform. The chloroform extract is washed with water and then dried over anhydrous sodium sulfate. Chloroform is removed by distillation, leaving the desired 16-diacetylmethyl-3β-hydroxypregn-5-en-20-one as residue. The product has the formula

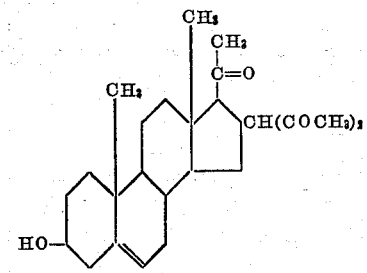

*Example 6*

*16-diacetylmethylpregn-4-ene-3,20-dione.*—To a solution of 2 parts of 16-diacetylmethyl-3β-hydroxypregn-5-en-20-one in 100 parts of dry toluene and 12 parts of freshly distilled cyclohexanone refluxing at the boiling point is added a solution of 3 parts of aluminum isopropoxide in 50 parts of dry toluene. Heating at the boiling point is continued for 15 minutes, with agitation, at which point approximately 30 parts of a saturated aqueous solution of Rochelle salt is introduced. Volatile organics are removed by steam distillation, and product is extracted from the distilland with chloroform. The chloroform extract is washed with water and finally dried over anhydrous sodium sulfate. Solvent is stripped by vacuum distillation; and the residue is then chromatographed on silica gel, using benzene and ethyl acetate as developing solvents. The resultant 16-diacetylmethyl-pregn-4-ene-3,20-dione has the formula

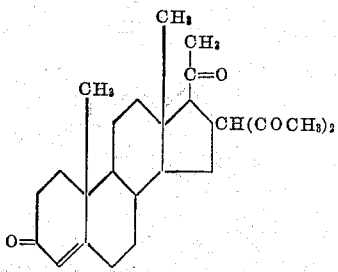

Example 7

3β - acetoxy - 16 - di(ethoxycarbonyl)methylpregn - 5-en-20-one.—Using the technique of Example 4 but replacing acetylacetone therein with like quantities of diethyl malonate, there are obtained both the α and β (at carbon atom 16) isomers of 3β-acetoxy-16-di(ethoxycarbonyl)methylpregn-5-en-20-one. The one isomer, crystallized from 80% aqueous alcohol, melts at 122–124° C. The second isomer, crystallized from 70% aqueous alcohol, melts at 139–140° C. The products are represented by the formula

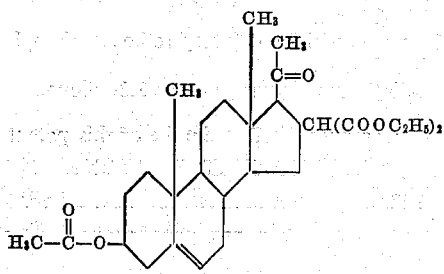

Example 8

16 - di(ethoxycarbonyl)methyl - 3β - hydroxypregn - 5-en-20-one.—Using the technique of Example 5 but replacing the 3β-acetoxy-16-diacetylmethylpregn-5-en-20-one therein called for with 20 parts of 3β-acetoxy-16-di(ethoxycarbonyl)methylpregn-5-en-20-one, there is obtained 16-di(ethoxycarbonyl)methyl-3β-hydroxypregn-5-en-20-one, of the formula

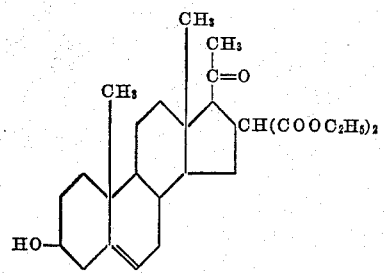

Example 9

16 - di(ethoxycarbonyl)methylpregn - 4 - ene - 3,20-dione.—Using the technique of Example 6 but replacing the diacetylmethylpregnene therein with a like quantity of the di(ethoxycarbonyl)methylpregnene of the preceding Example 8, there is obtained 16-di(ethoxycarbonyl)methylpregn-4-ene-3,20-dione, of the formula

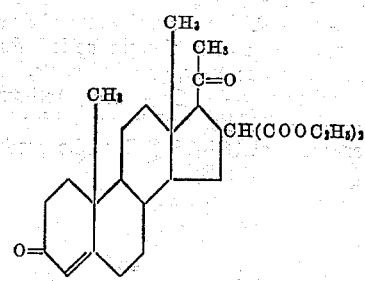

Example 10

16 - [α - (ethoxycarbonyl)cyanomethyl] - 3β - hydroxypregn-5-en-20-one.—To a solution of 14 parts of sodium and 68 parts of ethyl cyanoacetate in 1000 parts of anhydrous ethyl alcohol is added 107 parts of 3β-acetoxypregna-5,16-dien-20-one. The resultant mixture is stirred until a clear solution is obtained, and the latter is allowed to stand at room temperatures for three days. The solution is then neutralized with acetic acid, diluted with water, and finally subjected to chloroform extraction to remove the desired product. Solvent is evaporated from the extract, whereupon the residue is chromatogarphed on silica gel, using benzene and ethyl acetate as developing solvents. Crystallization of the 16-[α-(ethoxycarbonyl)cyanomethyl] - 3β - hydroxypregn - 5 - en-20-one thus isolated from ethyl acetate affords the product in clusters of short needles melting at 194–196° C. The product has the formula

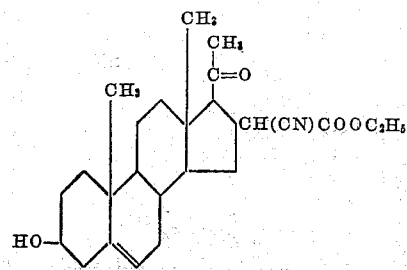

Example 11

16-[α-(ethoxycarbonyl)cyanomethyl] - pregn - 4 - ene-3,20-dione.—Approximately 30 parts of 16-[α-(ethoxycarbonyl)cyanomethyl]-3β-hydroxypregn-5 - en - 20 - one in 1000 parts of dry toluene is oxidized by adding 300 parts of cyclohexanone and 300 parts of 20% (w./v.) aluminum isopropoxide in toluene and heating under reflux for 1½ hours at the boiling point. The reaction mixture is then cooled and treated with 1000 parts of 50% aqueous potassium sodium tartrate, following which the mixture is steam distilled to remove volatile organic components. The distilland is extracted with chloroform, solvent subsequently being evaporated in vacuo and the residue chromatographed on silica gel, using benzene and ethyl acetate as developing solvents. Crystallization of the product thus isolated from ethyl acetate gives thick needles melting at 213–216° C. The material so obtained is 16-[α-(ethoxycarbonyl)cyanomethyl] - pregn-4-ene-3,20-dione, having the formula

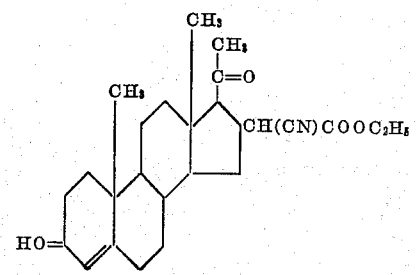

Example 12

*3β - acetoxy - 16 - [α - (acetyl)ethoxycarbonylmethyl] pregn-5-en-20-one.*—Using the technique of Example 4 but replacing the acetylacetone therein called for with the same quantities, respectively, of ethyl acetoacetate, there is obtained 3β-acetoxy - 16-[α - (acetyl)ethoxycarbonylmethyl]pregn-5-en-20-one, which crystallized from isopropyl ether, melts at 165–167° C. The product has the formula

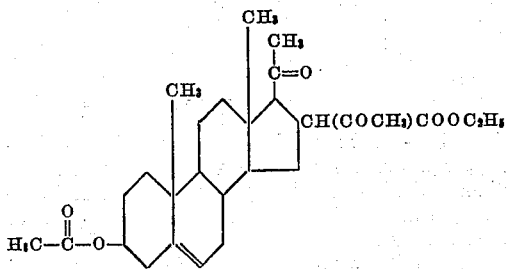

Example 13

*16 - [α-(acetyl)ethoxycarbonylmethyl] - 3β - hydroxypregn-5-en-20-one.*—Using the technique of Example 5 but replacing the diacetyl compound therein with 20 parts of 3β-acetoxy - 16 - [α - (acetyl)ethoxycarbonylmethyl]pregn-5-en-20-one, there results 16-[α-(acetyl)ethoxycarbonylmethyl]-3β-hydroxypregn-5-en-20-one, of the formula

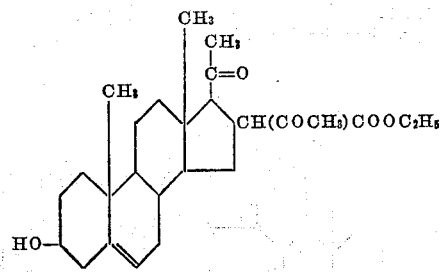

Example 14

*16-[α-(acetyl)ethoxycarbonylmethyl]pregn - 4 - ene-3,20-dione.*—Using the technique of Example 6 but replacing the diacetyl compound used therein as a starting material with 2 parts of 16-[α-(acetyl)ethoxycarbonylmethyl]-3β-hydroxypregn-5-en-20-one, there is obtained 16-[α-(acetyl)ethoxycarbonylmethyl]pregn - 4 - ene-3,20-dione, having the formula

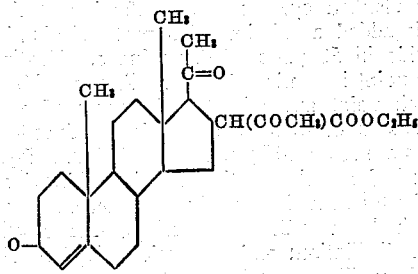

What is claimed is:
1. A compound of the formula

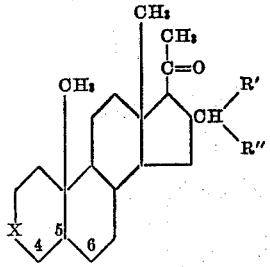

wherein the 16-methyl substituents, R' and R" are selected from the group consisting of cyano, acetyl, and ethoxycarbonyl radicals; X is selected from the group consisting of β-hydroxymethylene, β-(lower alkanoyl)oxymethylene, and carbonyl radicals; and there is a double bond situate in the 4(5) position when X is carbonyl, otherwise a 5(6) double bond is present.

2. 16-dicyanomethyl-3β-hydroxypregn-5-en-20-one.
3. 3β-acetoxy-16 - di(ethoxycarbonyl)methylpregn - 5-en-20-one.
4. 3β-acetoxy-16-diacetylmethylpregn-5-en-20-one.
5. 16-[α-(ethoxycarbonyl)cyanomethyl] - 3β-hydroxypregn-5-en-20-one.
6. 3β-acetoxy-16-[α - (acetyl)ethoxycarbonylmethyl]-pregn-5-en-20-one.
7. 16-dicyanomethylpregn-4-ene-3,20-dione.

References Cited in the file of this patent
UNITED STATES PATENTS

| | | |
|---|---|---|
| 2,394,962 | Bruson | Feb. 12, 1946 |
| 2,817,671 | Mazur | Dec. 24, 1957 |

UNITED STATES PATENT OFFICE
CERTIFICATE OF CORRECTION

Patent No. 2,932,655          April 12, 1960

Robert H. Mazur et al.

It is hereby certified that error appears in the printed specification of the above numbered patent requiring correction and that the said Letters Patent should read as corrected below.

Column 6, lines 72 to 75, left-hand portion of the formula should appear as shown below instead of as in the patent:

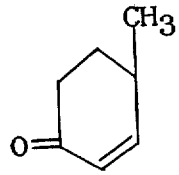

Signed and sealed this 20th day of September 1960.

(SEAL)
Attest:

KARL H. AXLINE
Attesting Officer

ROBERT C. WATSON
Commissioner of Patents